(12) United States Patent
Clark

(10) Patent No.: US 6,445,777 B1
(45) Date of Patent: Sep. 3, 2002

(54) MOBILE TELE-COMPUTER NETWORK

(75) Inventor: Curtis Clark, Beverly Hills, CA (US)

(73) Assignee: NeTune Communications, Inc., Culver City, CA (US)

( * ) Notice: Subject to any disclaimer, the term of this patent is extended or adjusted under 35 U.S.C. 154(b) by 0 days.

(21) Appl. No.: 09/217,682

(22) Filed: Dec. 21, 1998

Related U.S. Application Data

(63) Continuation-in-part of application No. 08/718,748, filed on Sep. 23, 1996, now Pat. No. 5,960,074.

(51) Int. Cl.$^7$ .................... H04M 1/64; H04M 11/00; H04M 3/42
(52) U.S. Cl. ............... 379/88.13; 379/88.17; 379/101.01; 379/102.01; 379/142.15; 379/201.01; 379/201.05
(58) Field of Search ................ 379/88.13, 88.17, 379/93.09, 93.14, 100.12, 100.15, 112.09, 142.16, 185, 224, 225, 310, 101.01, 102.01, 102.03, 142.15, 201.01, 201.05, 265.09, 258, 268, 269; 370/401, 465, 466, 353, 316; 455/3.2, 9, 14, 54.1, 447, 12.1, 427, 428, 456

(56) References Cited

U.S. PATENT DOCUMENTS

| | | | |
|---|---|---|---|
| 5,095,480 A | | 3/1992 | Fenner .................... 370/94.1 |
| 5,327,486 A | | 7/1994 | Wolff et al. .................. 379/96 |
| 5,410,737 A | | 4/1995 | Jones ...................... 455/56.1 |
| 5,570,354 A | * | 10/1996 | Simon ........................ 370/26 |
| 5,857,201 A | * | 1/1999 | Wright, Jr. et al. ......... 707/104 |
| 5,915,207 A | * | 6/1999 | Dao et al. ..................... 455/9 |
| 6,115,384 A | * | 9/2000 | Parzych ..................... 370/401 |
| 6,175,717 B1 | * | 1/2001 | Rebec et al. ................ 455/3.2 |

* cited by examiner

Primary Examiner—Allan Hoosain
(74) Attorney, Agent, or Firm—Brown Rayman Millstein Felder & Steiner, LLP

(57) ABSTRACT

A telecomputer network is described. The network comprises a satellite communication system, at least one mobile vehicle, and a wireless local area network (LAN). In one embodiment, the satellite communication system transfers information using ethernet packet switching. In one embodiment, the wireless LAN transfers information using the TCP/IP protocol. The mobile vehicle or portable field unit is configured to transfer information as a single nomadic transmission/reception point between the satellite communication system and the wireless LAN.

28 Claims, 1 Drawing Sheet

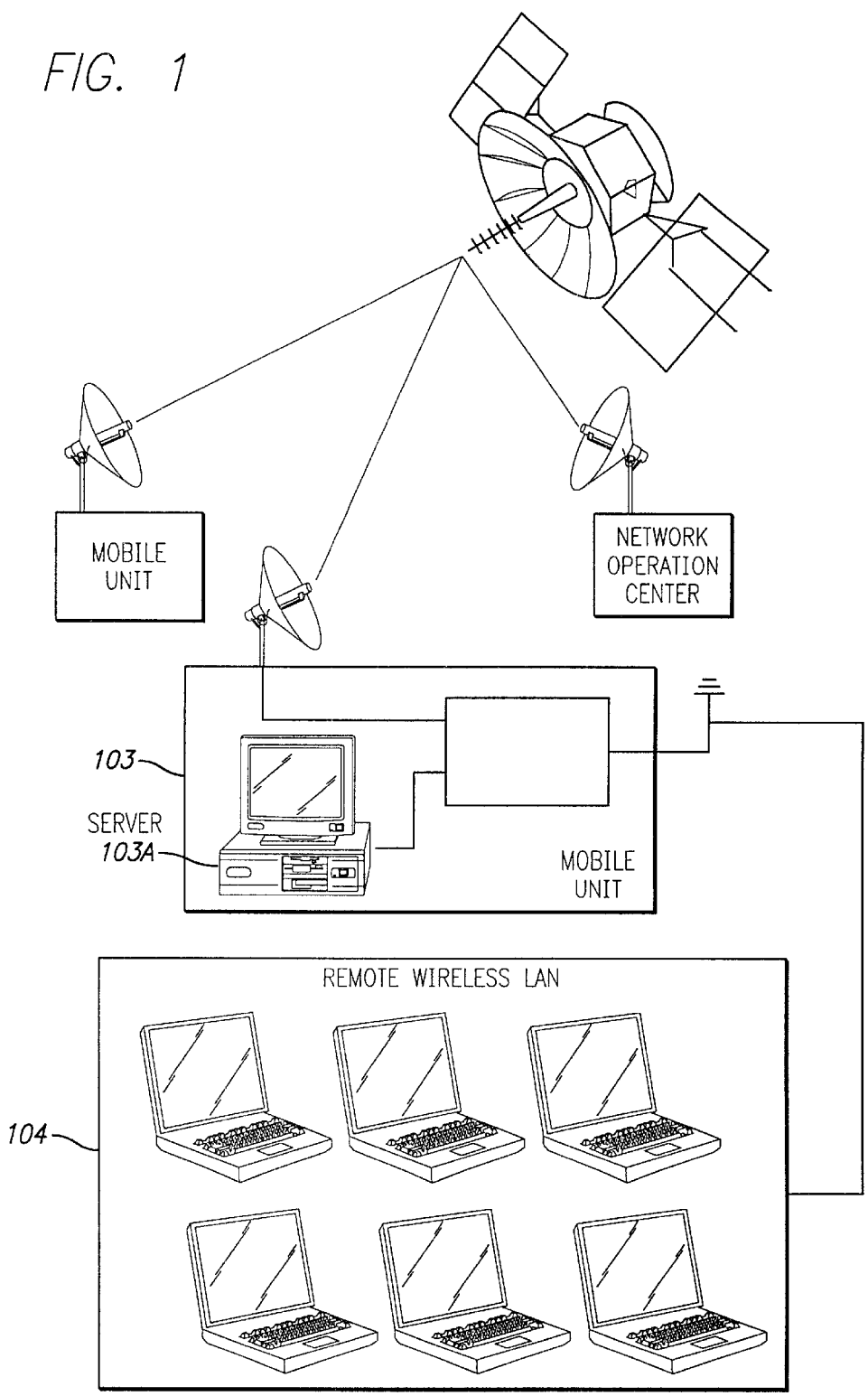

MOBILE TELE-COMPUTER NETWORK

This application is a continuation-in-part of application Ser. No. 08/718,748, entitled Mobile Tele-Computer Network for Motion Picture, Television and TV Advertising Production, filed Sep. 23, 1996, now U.S. Pat. No. 5,960,074.

FIELD OF THE INVENTION

The present invention relates to the field of communications systems; more particularly, the present invention relates to mobile communications designed for advantageous use with motion picture, television and TV advertising production.

BACKGROUND OF THE INVENTION

Most areas of corporate enterprise are rapidly advancing their productivity via the use of computer networking. Computer networking is the connecting of multiple computers into a common communication system so that information may be exchanged between them. Computer network technology is redefining the way corporate America works. Computers and networking are being converged, spawning a synergistic fusion between the two that is reshaping current understanding of computer functionality. The advent of mobile computing employing high powered full-featured laptop and notebook computers as replacements for conventional desktop computer systems has enabled the "virtual office" to become the fastest growing area of business "real estate".

Intranets have recently begun to replace traditional client-server private networks as the chosen preference for network-centric (group) tele-computing. An Intranet is a private computer network using public Internet TCP/IP protocols and designed to be the most efficient and easy to use network for sharing information and data, including text, image and audio. Intranets are relatively cheap, they can exploit Internet features including the ability to establish Web sites to disseminate information, and they use available browsers (e.g., Netscape) to search for information.

The creative and commercial success of Motion Picture, Television and TV Advertising film production is dependent on the ability of the parties to communicate with their audiences. Likewise, the professionals engaged in the making of these films and TV shows would greatly enhance their efficiency and thereby reduce their production costs by incorporating computer network technology into their highly mobile work environment. Such technology may also improve prospects for more effective creative collaboration. However, there is currently no integrated and coherent mobile network computing technology that satisfies the needs of motion picture, television, and TV advertising production.

Although historically slow in embracing new electronic techniques, film and TV production personnel have recently been awakening to the incredible benefits that accrue from incorporating networked computing into their work and lifestyles. Fueled by the escalating need for ever greater efficiency to reduce production costs, a system to incorporate telecomputing into film and TV production is needed.

Furthermore, the realities of Motion Picture, Television, and Advertising film production demand a fail-safe reliability to any of the service areas that it depends on. Therefore, any solution that reduces production cost and increase efficiency cannot be implemented at the expense of reliability.

The present invention provides a telecomputer network that satisfies the needs of the Motion Picture, Television and TV Advertising industry. The network may be used to increase efficiency, reduce production costs and enhance creative collaboration, while maintaining reliability.

SUMMARY OF THE INVENTION

A telecomputer network is described. The network of the present invention includes a wireless voice and data wide area network (WAN) comprises a digital satellite communications system with a network operations center that controls voice and data traffic. The network also comprises at least one mobile communication hub and a wireless local area network (LAN). In one embodiment, the network uses a mesh topology to allow transmission and reception from one mobile communications hub to another mobile communications hub or transmission reception from a mobile communications hub to the network operations center. Point-to-point digital microwave links may be used to allow transmission and reception from fixed locations to the network operations center. In one embodiment, the satellite communication system and the wireless LAN transfer information using an ethernet packet switching protocol, such as an Internet protocol (e.g., the TCP/IP protocol). The mobile hub may be in the form of a mobile vehicle (e.g., van) configured to transfer information as a single nomadic transmission/reception point between the satellite communication system (i.e., the wireless WAN) and the wireless LAN.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 1 is a block diagram of one embodiment of the system of the present invention.

DETAILED DESCRIPTION OF THE PRESENT INVENTION

A mobile network for use is described. In the following description, numerous details are set forth, such as bit rates, distances, etc. It will be apparent, however, to one skilled in the art, that the present invention may be practiced without these specific details. In other instances, well-known structures and devices are shown in block diagram form, rather than in detail, in order to avoid obscuring the present invention.

Overview of the Present Invention

A tele-computing network architecture is described. In one embodiment, the network comprises a wireless local area network (LAN), at least one mobile hub, and a wireless wide area network (WAN) that includes a satellite communication system with a network operations center to control voice and data traffic. In one embodiment, the satellite communication system is a digital satellite system, although it may be analog. The mobile hub may be in the form of a mobile vehicle (e.g., a van) or a portable field unit and is configured to transfer information as a single nomadic transmission/reception point between the satellite communication system and the wireless LAN.

In one embodiment, the architecture includes a point-to-point microwave communication system to relay data from the fixed locations to the network operations center.

In one embodiment, the satellite and terrestrial microwave communication system transfers information using a satellite transponder or fixed terrestrial microwave radio via an ethernet packet switching protocol such as, for example, the IEEE 802 series of protocols or any proprietary protocols the TCP/IP protocol used on the World Wide Web. By using the ethernet packet communication, multiple applications may access the satellite communications network or terrestrial communications network. The wireless LAN also utilizes the ethernet protocol to transfer information.

In one embodiment, the wireless WAN of the present invention operates as a private Intranet using the TCP/IP protocols of the Internet. Its user operation may be based on the platform independent, Graphical User Interface (GUI) of the World Wide Web (e.g., Netscape Navigator) CGI (Common Gateway Interface), DHTML (Dynamic Hyper-Text Markup Language), XML (extensible Markup Language) and SGML (Standard Generalized Markup Language). By using Web browser software (HTML, VRML, Java language, and numerous audiovisual "plug-ins" developed for Netscape), the present invention may create an effective, efficient, and easy to use Web based graphical multimedia environment for the dissemination of information and data on a private intranet, such as one used by media production industries.

Although the architecture is described with use of the TCP/IP Internet protocol, other protocols may be used. For instance, other protocols which may be employed by the architecture include asynchronous transfer mode (ATM), Internet Packet Exchange (IPX) protocol, Lotus Notes, SNMP (Simple Network Management Protocol), NNP, Multiple Internet Mail Exchange (MIME), IP (Internet protocol) ATM, Web Network File System (WNFS), File Transfer Protocol (FTP), Fiber Distributed Data Interface (FDDI), Reliable Multi-cast Transfer Protocol (RMTP), and Multi-protocol Over ATM (MPOA).

The wireless WAN is preferably a secure network. In such a case, software programs provide a secure "fire wall" to bar unauthorized entry from the public Internet. In one embodiment, access codes and passwords are used to control access to data available through the network. In one embodiment, encryption is used on all data traffic between designated locations and our secured intranet servers and the high speed wireless digital network. Such security in the form of software is well-known in the art.

In one embodiment, the existing Internet backbone may be employed, where necessary, for relaying data between the servers of system users and intranet servers that provide the gateway to the wireless network of the present invention.

The integration of wireless LAN ethernet technology with a satellite voice and data communications system provides broadband, high speed wireless connections between locations and fixed sites, which supports, for example, industries such as the Motion Picture, Television, and TV Advertising industries. The high bandwidth and fast data rate wireless mobility also enable a custom designed, fully integrated mobile computer network system. The use of point-to-point digital terrestrial microwave links provides transmission reception between fixed sites and the master network operations center at high data rates.

Thus, a unique telecommunication system is provided that is a comprehensive full-featured mobile Web-based intranet information management and communication system supported by a broadband digital microwave terrestrial and/or satellite-based microwave network infrastructure.

Exemplary Network System Embodiments

FIG. 1 illustrates the network system of the present invention. Referring to FIG. 1, the system 100 of the present invention comprises a satellite communications subsystem that communicates with one or more mobile units, such as mobile unit 103, and one or more wireless local area network (LAN) 104. Note that in one embodiment, there is a mobile unit supporting every wireless LAN. The mobile unit may be a mobile vehicle. In the following description, a vehicle unit is referred to as a mobile hub station.

Wireless LANs at individual locations are linked to the satellite communications system of the present invention. In one embodiment, the LAN 104 is a wireless ethernet LAN connecting multiple remote personal computers (PCs) as nodes. In one embodiment, the LAN 104 covers an "on site" radius of up to ½ mile at 2 Mbps from a mobile hub station, strategically placed at the designated location, such as mobile vehicle 103. For instance, the LAN 104 may be at the production's location LAN to service the location tele-computing communication needs of a film or TV production unit, even when shooting on a stage or studio lot.

In one embodiment the LAN is secure. The LAN may employ standard encryption or logging on security. In an alternate embodiment, the LAN includes video conferencing capabilities.

In one embodiment, the LAN 104 transfers data at 1 to 100 megabits per second to single or multiple points in the network infrastructure, which is the mobile hub station such as the mobile unit 103 described below. In one embodiment, the mobile hub station is housed in a custom fitted motor home (e.g., vehicle, van) that not only links the location LAN 104 to the Internet backbone via the satellite communications system (i.e., the wireless WAN) but also to single or multiple points in the network infrastructure.

In one embodiment, the mobile hub station includes a file server which accesses a proxy server. The server, such as server 103A, in each hub station is used to coordinate communication with a satellite transmission/reception system. The server updates the server back at a master network operations center and operates in synchronization with the master network operations center. The file server may also employ file sharing and routes mail. The master network operations center would have access to these records.

In one embodiment, the mobile hub station also comprises a separate workstation viewing environment for broadband high resolution video or data. In one embodiment, a communications infrastructure is included for interactive relay of broadband real time video or large image and graphic data files. The video and large image and graphic image and data files can be transmitted and received at full workstation resolution. In one embodiment, the workstation includes a high resolution progressive scan monitor.

Note that the master network operations center may coordinate all communication over the telecomputing network of the present invention. The network operations center includes a server to control communications with the entire system. In one embodiment, the network operations center comprises a single master location. As the network operations center grows in size additional network operations centers may be added at other locations. These additional network operation centers may be interconnected by terrestrial-based high bandwidth fiber optic links to the master location. Other communication techniques such as, for example, satellite or other wireless techniques may be used. As bandwidth requirements increase, additional satellite communications equipment and transponder capacity may be included in order to reduce overloading of the space segment.

Software

The present invention uses Web-based software applications designed to facilitate information/data base organization and communication for the various areas of production specialization: directors; producers; cinematographers; editors; script supervisors; art directors; assistant directors; production managers; location managers; casting directors, etc.

In one embodiment, incorporated within its Web-based software applications, the service provides e-mail, downloading or uploading files from the FTP sites and Internet Relay Chat (IRC), as well as video conferencing. The system of the present invention may also offer the latest developments in "Web phone" voice communications and switched telephony from within the LAN to any telephones covered by local microcells outside the range of the LAN. This replaces conventional cellular phone connections and is seamlessly integrated with the Intranet's multi-media environment.

Acting as a "gateway" onto the full range of public Internet services, clients access any part of the Internet from their remote location nodes connected through one of a wireless LANs of the present invention, as well as from any conventional or cellular phone connection.

In one embodiment, the Intranet database management may be implemented using an inter/intranet standard such as IIOP (Internet Inter Operable-ORB) based on COBRA (Common Object Request Broker Architecture) and DCOM (Distributed Common Object Model) using active X framework.

The practical use of the mobile telecomputing network in the filmmaking process will become as routine and valued as that of the Cinematographer or Production Designer. The ability to do real time wireless relay of High Resolution digital film images from a graphics workstation directly to a shooting location offers new dynamic possibilities for the Digital Artist to participate as an active crew member in location filming. A skilled Digital Artist, working along side the Special FX Supervisor, may help shape the way Directors, Cinematographers, Production Designers and Producers are able to integrate their ideas with ever expanding possibilities of digital technology. Having remote mobile access during the shoot to digital image processing via the broadband wireless relay network of the present invention combine traditionally separated production from post-production.

CGI (Computer Graphics Imaging) work in progress, designed as composite components for live action images, can be relayed for viewing and manipulation by members of the shooting crew. The CGI work can be evaluated and altered from the location and transmitted to digital effects house or any specified location. An additional two-way collaborative video-conferencing link can be established, thereby making CGI truly interactive with the live-action filming process. Virtual Sets that will eventually be composited with the final film image can be integrated as reference components into camera compositions during live action shooting utilizing a high quality video assist. Video assist images can be captured from the camera view finder and relayed over the mobile tele-computing network to specified locations.

Digital animated multimedia storyboards that are capable of incorporating 3D spatial renderings can become valuable interactive tools both for conceptual fine tuning and shot planning. Input from a variety of image sources, including photographic, graphic and CGI, both still and/or full motion, can be incorporated to generate a fertile environment facilitating the creative process. These animated multimedia storyboards will be able to function as evolving organic "documents" during the entire production process helping to fine tune ideas and concepts between the director and his/her key collaborators.

Any information or data relevant to production administration, e.g., story boards, scripts or script changes, production schedules, budgets, maps and directions, location photos, call sheets, casting information, payroll information, accounting reports, bulletins, personnel directories, vendor catalogues, etc., incorporating text, audio, image, video can be uploaded to the production company's private intranet Web server resident at a central office(s) and accessed on demand by any authorized personnel regardless of their location. Even if a production member is outside the wireless LAN/WAN Service Area, access to the private intranet may be made via any conventional public Internet connection from anywhere in the world via a modem or ISDN terminal adapter.

In one embodiment, the system uses a camera generated time code to link to the Web and network application servers. This allows for productions to cross-reference and access to all relevant data (e.g., script supervisor notes and camera data) to specific scenes and takes via this frame accurate time code.

Content that may be carried as traffic on the mobile telecomputing network on motion picture and television productions and TV advertising productions includes, but is not limited to, the following:

production logistics data such as accounting data, budget data, scheduling data for production personnel, camera reports, production reports, costume and prop data;

telephony and fax services (using IP transport mechanisms or wireless telephony systems);

video teleconferencing and collaborative software, such as, for example electronic white board conferencing;

high-bandwidth motion picture audio and visual materials such as computer graphics imaging, composited digital film images, digital special effects, digitized motion picture film, telecined digital video, digital audio sequences, non-linear editing files, multimedia data for still and compressed image and video materials;

Internet, Extranet and electronic commerce information and data, such as access to vendor sites for camera rental, lighting rental, props, etc.; and e-mail and integrated messaging services.

The system may be used in oil and gas exploration. Content that may be carried as traffic on the mobile telecomputing network oil and gas exploration, construction and any other industries requiring nomadic communications systems includes, but is not limited to, the following:

business engineering logistics data such as accounting data, payroll, timesheets, meeting reports and memorandum, budget data, scheduling data, project management reports;

telephony and fax services (using IP transport mechanisms or wireless telephony systems);

video tele conferencing and collaborative software, such as electronic white board conferencing;

e-mail and integrated messaging services;

high-bandwidth engineering data such as CAD files, seismic and oil exploration imaging data, mapping and geographic data, architectural and construction drawings, site surveys and associated imaging and video data; and Internet, Extranet and electronic commerce information and data, such as access to vendor sites for equipment, services and materials that will be leased, rented or purchased. For example, drilling rigs, heavy construction equipment such as earthmovers, fittings, pipeline sections, helicopters, etc.

In one embodiment, some equipment may be designed as modular, portable and ruggedized packages that need little, if any, setup times and use small footprint designs.

In one embodiment, one such package offers an entire range of services in a portable, ruggedized field unit designed to provide both image delivery and production Intranet services in one package. In one embodiment, it may be used for sending and receiving large image and data files or non-linear editing sequences from post-production or digital effects facilities. A ruggedized, workstation-class computer with large RAID arrays (e.g., 45–80 GB) for local disk storage and local tape or optical backup may be integrated into the portable unit as a "receive and store" system to ensure faster local access to data and complete data integrity. A production Intranet service may be provided for continuous Intranet and Extranet connectivity and complete communications services for IP telephony and fax services. Wireless local LAN connectivity and wireless phone systems may be provided for personal mobility. It may be equipped with two fully automated antenna systems for image delivery and production Intranet services. Other functionalities, as described below, may be included for full wireless connectivity. Optional items include:

Portable NT Graphics Workstation and/or

Portable SGI Graphics Workstation

Collaborative Videoconferencing (High Quality System)

Real-time 4:2:2 NTSC/PAL digital video and audio

Portable Digital Video Assist Recorder

Additional Notebooks

In an alternate embodiment, another package is a medium-sized portable field unit in a ruggedized case designed to deliver image delivery services such as digital effects sequences, non-linear editing sequences and other large image or data files. A ruggedized, workstation-class computer with large RAID arrays (e.g., 45–80 GB) for local disk storage and local tape and optical backup may be integrated into the portable unit as a "receive and store" system to ensure faster local access to data and complete data integrity. It may be used at sites that may have existing graphics workstations, digital video workstations or non-linear editing stations. It may also support an optional real-time 4:2:2 NTSC/PAL digital video and audio.

In still another embodiment, a package is a smaller portable field unit in a ruggedized case designed to provide continuous Intranet and Extranet connectivity and IP satellite telephony and IP fax services. Wireless local LAN connectivity and wireless phone systems may be provided for personal mobility A small workstation may be included as a local server to provide faster local connectivity and ensure data integrity. A separate automated antenna kit may also be included in a ruggedized case. The NOC provides connectivity to the wired infrastructure and Internet.

In one embodiment, a portable NT graphics workstation may provide an optional, lower cost graphics viewing package as a portable field unit in a ruggedized case designed to complement the full location and image delivery packages. It may be capable of viewing and playback of digital effects and non-linear editing sequences, using various imaging file formats such as Cineon, Alias and SoftImage up to D-1 resolution. It may have a color-corrected monitor to provide uniform viewing environments. It may also have a "hot-swappable" drive to allow field playback of video assist sequences captured using the digital video assist recorder. It may also include a remote color calibration system to ensure precise matching of colorimetry and the Cineon system to ensure accurate previews of digitally-composited material and CGI elements.

In on embodiment, a portable SGI graphics workstation may be an optional, high-powered graphics viewing package based on the SGI Octane is a portable field unit in a ruggedized case designed as a complement to the full location and image delivery packages. It may be capable of viewing and playback of longer digital effects and non-linear editing sequences, using various imaging file formats such as Cineon, Alias and SoftImage at higher resolutions than the NT model. This workstation may provide image resolutions than the NT model. This workstation may provide image resolutions from d-1 to 3k×4k and will be designed for field viewing conditions. It may include a remote color calibration system for precise matching of colorimetry and the Cineon system to ensure accurate previews of digitally composited material and CGI elements.

In one embodiment, a portable digital video assist recorder, based on NT workstation in a ruggedized portable field case, may be used to capture images directly from video assist feeds on Panavision cameras at D-1 resolutions. It may have a "hot-swappable" drive to allow direct transfer of captured sequences to the Image Delivery server for transmission to other locations or to view sequences on the Portable NT Graphics Workstation. Simple and ruggedized operator control may be installed to make the recorder function like a video cassette In one embodiment, a portale location scout and pre-production package is included, which is a smaller version of the Portable Production Intranet Package scaled-down to fit inside a car trunk or small van. It may be light enough for one person to carry and have a small automatically aligning antenna system. It may deliver data from remote locations at speeds up to 1.5 megabits per second. A notebook computer with a wireless LAN connection may be included in the package along with a small satellite phone. With this package, a pre-production person can scout location sites and capture images with a digital still camera using the Kodak PREview system, then transmit the images in a matter of seconds or minutes to any NeTune-enabled location.

Whereas many alterations and modifications of the present invention will no doubt become apparent to a person of ordinary skill in the art after having read the foregoing description, it is to be understood that the particular embodiment shown and described by way of illustration is in no way intended to be considered limiting. Therefore, references to details of the various embodiment are not intended to limit the scope of the claims.

Thus, a mobile tele-computer network has been described.

I claim:

1. A system comprising:
a satellite communication subsystem;
a wireless local area network (LAN) that includes at least one computer; and
a mobile unit configured to transfer broadband information as a single nomadic transmission/reception point between the satellite communication subsystem and the wireless LAN using an ethernet packet switching protocol.

2. The system defined claim 1 wherein the broadband information comprises data.

3. The system defined claim 1 wherein the broadband information comprises audio and image data, such that the subsystem, wireless LAN and mobile hub transfer broadband audio and image data.

4. The system defined claim 1 wherein the information is transferred using the TCP/IP protocol.

5. The system defined claim 1 wherein the wireless LAN comprises a plurality of nodes with at least one personal computer at each of the plurality of nodes.

6. The system defined claim 1 wherein the mobile unit comprises an uplink to the satellite communication subsystem.

7. The system defined claim 1 wherein the mobile hub comprises a server to control the relaying of information.

8. The system defined claim 1 wherein the mobile unit comprises a workstation viewing environment.

9. The system defined in claim 1 wherein the mobile unit comprises a vehicle.

10. A system comprising:
    a satellite communication subsystem to operate as a secured private intranet to transfer broadband information using a ethernet packet switching protocol;
    a wireless local area network (LAN) to transfer information using the ethernet packet protocol, wherein the wireless LAN comprises a plurality of nodes with an individual computer at each of the plurality of nodes; and
    a mobile unit to transfer broadband information as a single nomadic transmission/reception point between the satellite communication system and the wireless LAN.

11. The system defined claim 10 wherein the broadband information comprises data.

12. The system defined claim 10 wherein the broadband information comprises audio and image data, such that the subsystem, wireless LAN and mobile hub transform broadband audio and image data.

13. A telecomputer network system comprising:
    a satellite communications system;
    a wireless local area network (LAN); and
    a mobile hub station configured to transfer information as a single nomadic transmission/reception point between the satellite communication system and the wireless LAN, such that information is transferred over the network using ethernet packet switching protocol.

14. The network defined claim 13 wherein the satellite communication system operates as a secured private intranet.

15. The network defined claim 13 wherein the information is transferred using the TCP/IP protocol.

16. The network defined claim 13 wherein the wireless LAN comprises a plurality of nodes with at least one personal computer at each of the plurality of nodes.

17. The network defined claim 13 wherein the satellite communication system comprises a network operations center, a plurality of hubs, wherein each hub comprises a wireless router and a relay station to relay information between hubs.

18. The network defined claim 13 wherein the mobile hub station comprises an uplink to the satellite communication system.

19. The network defined claim 13 wherein the mobile hub station is configured to relay information between the wireless LAN and the satellite communication system, and comprises a server to control the relaying of information.

20. The network defined claim 13 wherein the mobile hub station comprises a workstation viewing environment.

21. The network defined in claim 13 wherein the mobile hub station comprises a vehicle or a portable field unit.

22. A telecomputer network comprising:
    a wireless wide area network (WAN) comprising a redundant satellite communication system configured to operate as a intranet;
    a wireless local area network (LAN), wherein the wireless LAN comprises a plurality of nodes with an individual personal computer at each of the plurality of nodes; and
    a mobile vehicle or portable field unit configured to transfer information as a single nomadic transmission/reception point between the satellite communication system and the wireless LAN, wherein transfers of information over the network using the TCP/IP protocol.

23. The network defined claim 22 wherein the wireless WAN operates as a private intranet.

24. The network defined claim 22 wherein the satellite communication system comprises a plurality of hubs, wherein each hub comprises a wireless router and a satellite transmission/reception system to relay information between hubs.

25. The network defined claim 22 wherein the mobile vehicle comprises an uplink to the satellite communication system.

26. The network defined claim 22 wherein the mobile vehicle is configured to relay information between the wireless LAN and the satellite communication system, and comprises a server to control the relaying of information.

27. The network defined claim 22 wherein the mobile vehicle comprises a workstation viewing environment.

28. A telecomputer network comprising:
    a satellite communication system configured to operate as a secured private intranet to transfer information using a ethernet packet switching protocol;
    a wireless local area network (LAN) configured to transfer information using the ethernet packet protocol, wherein the wireless LAN comprises a plurality of nodes with an individual personal computer at each of the plurality of nodes; and
    a plurality of mobile vehicles, or portable field units wherein each mobile vehicle or portable field unit is configured to transfer information as a single nomadic transmission/reception point between the satellite communication system and the wireless LAN.

* * * * *

UNITED STATES PATENT AND TRADEMARK OFFICE
CERTIFICATE OF CORRECTION

PATENT NO. : 6,445,777 B1  Page 1 of 1
DATED : September 3, 2002
INVENTOR(S) : Curtis Clark, James Pat Block and Raman Nagarajan It is certified that error appears in the above-identified patent and that said Letters Patent is hereby corrected as shown below:

<u>Title page,</u>
Item [12], United States Patent, change "Clark" to -- Clark et al. --

Item [75], Inventor, change "Inventor" to -- Inventors --.
Add the names -- James Pat Block, Los Angeles, CA (US), Raman Nagarajan, Los Angeles, CA (US) --.

<u>Column 3,</u>
Line 16, change the word "(extensible" to -- (eXtensible --.
Line 31, after the word "protocol)" add -- - --.

<u>Column 6,</u>
Line 33, after the word "example" add -- , --.

<u>Column 7,</u>
Line 52, after the word "mobility" add -- . --.

<u>Column 8,</u>
Line 5, change the word "on" to -- one --.
Line 7, after the word "Octane" add the word -- which --.
Line 13, after the word "provide" add the word -- greater --.
Line 28, after the word "cassette" add -- . --.

Signed and Sealed this

Seventh Day of January, 2003

JAMES E. ROGAN
*Director of the United States Patent and Trademark Office*

UNITED STATES PATENT AND TRADEMARK OFFICE
CERTIFICATE OF CORRECTION

PATENT NO.        : 6,445,777 C2
APPLICATION NO.   : 90/010991
DATED             : April 8, 2014
INVENTOR(S)       : Curtis Clark, James Pat Block and Raman Nagarajan It is certified that error appears in the above-identified patent and that said Letters Patent is hereby corrected as shown below:

On the Title Page
Item (73) Assignee - replace "Palm Finance Corporation, Santa Monica, CAN (US)" with
-- Advanced Media Networks, LLC, Los Angeles, CA (US) --.

Signed and Sealed this
Twentieth Day of May, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 6,445,777 C2 | Page 1 of 1 |
| APPLICATION NO. | : 90/012729 | |
| DATED | : April 8, 2014 | |
| INVENTOR(S) | : Curtis Clark, James Pat Block and Raman Nagarajan | |

It is certified that error appears in the above-identified patent and that said Letters Patent is hereby corrected as shown below:

On the Title Page
Item (73) Assignee - replace "Palm Finance Corporation, Santa Monica, CAN (US)" with
-- Advanced Media Networks, LLC, Los Angeles, CA (US) --.

This certificate supersedes the Certificate of Correction issued May 20, 2014.

Signed and Sealed this
Ninth Day of September, 2014

Michelle K. Lee
*Deputy Director of the United States Patent and Trademark Office*

(12) EX PARTE REEXAMINATION CERTIFICATE (8661st)
United States Patent
Clark et al.

(10) Number: US 6,445,777 C1
(45) Certificate Issued: Nov. 15, 2011

(54) MOBILE TELE-COMPUTER NETWORK

(75) Inventors: Curtis Clark, Beverly Hills, CA (US); James Pat Block, Los Angeles, CA (US); Raman Nagarajan, Los Angeles, CA (US)

(73) Assignee: Advanced Media Networks, LLC, Los Angeles, CA (US)

Reexamination Request:
No. 90/010,991, May 11, 2010

Reexamination Certificate for:
Patent No.: 6,445,777
Issued: Sep. 3, 2002
Appl. No.: 09/217,682
Filed: Dec. 21, 1998

Certificate of Correction issued Jan. 7, 2003.

Related U.S. Application Data

(63) Continuation-in-part of application No. 08/718,748, filed on Sep. 23, 1996, now Pat. No. 5,960,074.

(51) Int. Cl.
*H04M 01/64* (2006.01)
*H04M 11/00* (2006.01)
*H04M 03/42* (2006.01)

(52) U.S. Cl. ............. 379/88.13; 379/88.17; 379/101.01; 379/102.01; 379/142.15; 379/201.01; 379/201.05

(58) Field of Classification Search .................. None
See application file for complete search history.

(56) References Cited

To view the complete listing of prior art documents cited during the proceeding for Reexamination Control Number 90/010,991, please refer to the USPTO's public Patent Application Information Retrieval (PAIR) system under the Display References tab.

*Primary Examiner* — Minh Dieu Nguyen

(57) ABSTRACT

A telecomputer network is described. The network comprises a satellite communication system, at least one mobile vehicle, and a wireless local area network (LAN). In one embodiment, the satellite communication system transfers information using ethernet packet switching. In one embodiment, the wireless LAN transfers information using the TCP/IP protocol. The mobile vehicle or portable field unit is configured to transfer information as a single nomadic transmission/reception point between the satellite communication system and the wireless LAN.

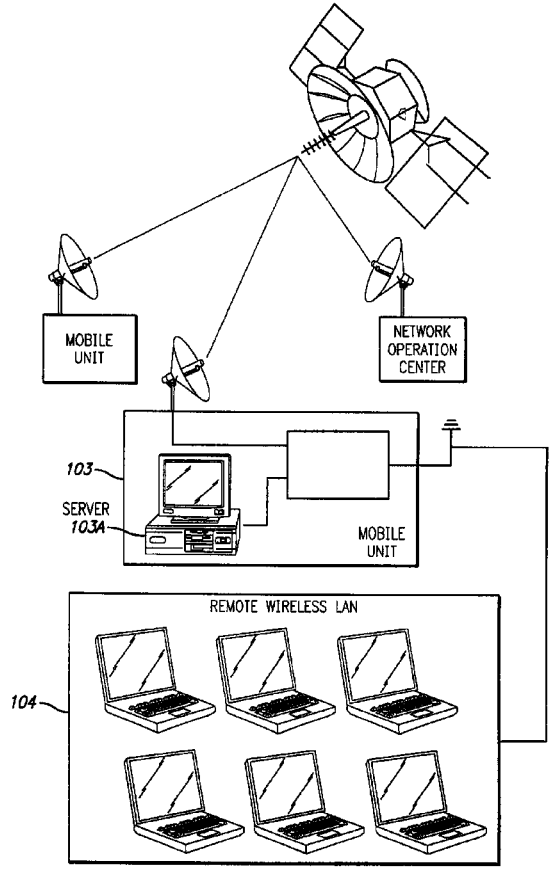

US 6,445,777 C1

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1, 10, 13, 21-22 and 28 is confirmed.

Claims 2-9, 11-12, 14-20 and 23-27 are determined to be patentable as amended.

New claims 29-109 are added and determined to be patentable.

2. The system defined in claim 1 wherein the broadband information comprises data.

3. The system defined in claim 1 wherein the broadband information comprises audio and image data, such that the subsystem, wireless LAN and mobile hub transfer broadband audio and image data.

4. The system defined in claim 1 wherein the information is transferred using the TCP/IP protocol.

5. The system defined in claim 1 wherein the wireless LAN comprises a plurality of nodes with at least one personal computer at each of the plurality of nodes.

6. The system defined in claim 1 wherein the mobile unit comprises an uplink to the satellite communication subsystem.

7. The system defined in claim 1 wherein the mobile hub comprises a server to control the relaying of information.

8. The system defined in claim 1 wherein the mobile unit comprises a workstation viewing environment.

9. The system defined in claim 1 wherein the mobile unit comprises a vehicle.

11. The system defined in claim 10 wherein the broadband information comprises data.

12. The system defined in claim 10 wherein the broadband information comprises audio and image data, such that the subsystem, wireless LAN and mobile hub transform broadband audio and image data.

14. The network defined in claim 13 wherein the satellite communication system operates as a secured private intranet.

15. The network defined in claim 13 wherein the information is transferred using the TCP/IP protocol.

16. The network defined in claim 13 wherein the wireless LAN comprises a plurality of nodes with at least one personal computer at each of the plurality of nodes.

17. The network defined in claim 13 wherein the satellite communication system comprises a network operations center, a plurality of hubs, wherein each hub comprises a wireless router and a relay station to relay information between hubs.

18. The network defined in claim 13 wherein the mobile hub station comprises an uplink to the satellite communication system.

19. The network defined in claim 13 where the mobile hub station is configured to relay information between the wireless LAN and the satellite communication system, and comprises a server to control the relaying of information.

20. The network defined in claim 13 wherein the mobile hub station comprises a workstation viewing environment.

23. The network defined in claim 22 wherein the wireless WAN operates as a private intranet.

24. The network defined in claim 22 wherein the satellite communication system comprises a plurality of hubs, wherein each hub comprises a wireless router and a satellite transmission/reception system to relay information between hubs.

25. The network defined in claim 22 wherein the mobile vehicle comprises an uplink to the satellite communication system.

26. The network defined in claim 22 wherein the mobile vehicle is configured to relay information between the wireless LAN and the satellite communication system, and comprises a server to control the relaying of information.

27. The network defined in claim 22 wherein the mobile vehicle comprises a workstation viewing environment.

*29. The system of claim 1 wherein the mobile unit is configured to transfer information using protocols selected from the group consisting of IEEE 802.10 protocol, Internet Packet Exchange (IPX) protocol, Lotus Notes, simple network management protocol (SNMP), Multiple Internet Mail Exchange (MIME) protocol, Web Network File System (WFNS) protocol, File Transfer Protocol (FTP), Fiber Distributed Data Interface (FDDI) and Reliable, Multi-cast Transfer Protocol (RMTP).*

*30. The system of claim 1, wherein the mobile unit is configured to transfer information as encrypted information.*

*31. The system of claim 1, wherein the wireless LAN operates as a secured private intranet and transfers encrypted information.*

*32. The system of claim 1, wherein the satellite communication subsystem transfers encrypted information and comprises secure firewall software programs.*

*33. The system of claim 1, wherein the satellite communication subsystem allows for user access to the World Wide Web through one or more web-based software applications.*

*34. The system of claim 33, wherein the one or more web-based software applications comprises an electronic mail application.*

*35. The system of claim 33, wherein the one or more web-based software applications allows for the transfer of information through File Transfer Protocol (FTP).*

*36. The system of claim 33, wherein the one or more web-based software applications comprises an Internet Relay Chat (IRC) application.*

*37. The system of claim 33, wherein the one or more web-based software applications comprises voice communication application.*

*38. The system of claim 33, wherein the one or more web-based software applications comprises a database management application.*

*39. The system of claim 1, wherein the satellite communication subsystem allows for user operation through Common Gateway Interface (CGI).*

*40. The system of claim 1, wherein the satellite communication subsystem allows for user operation through Dynamic HyperText Markup Language (DHTML).*

*41. The system of claim 1, wherein the satellite communication subsystem allows for user operation through extensible Markup Language (XML).*

*42. The system of claim 1, wherein the satellite communication subsystem allows for user operation through extensible Standard Generalized Markup Language (SGML).*

43. The system of claim 5, wherein the at least one personal computer at each of the plurality of nodes allows for the display of web browser software.

44. The system of claim 1, wherein the wireless LAN covers an on-site radius of up to 0.5 miles and operates at a range between 1 to 100 Mbps.

45. The system of claim 1, wherein the mobile unit is housed in a custom fitted motor home.

46. The system of claim 1, wherein the wireless LAN has video conferencing capabilities.

47. The system of claim 1, wherein the mobile unit is housed in a vehicle and links the wireless LAN to the Internet through the satellite communication subsystem.

48. The system of claim 1, wherein the mobile unit comprises a portable field unit.

49. The system of claim 1, wherein the mobile unit comprises a portable field unit, the portable field unit comprising a computer with RAID arrays and one or more antenna systems, wherein one or more antenna systems are for Intranet services and one or more antenna systems for image delivery.

50. The system of claim 1, further comprising one or more network operations centers, the one or more network operations centers operative to control the relay of information.

51. The system of claim 10 wherein the mobile unit is configured to transfer information using protocols selected from the group consisting of TCP/IP protocol, IEEE 802.10 protocol, Internet Packet Exchange (IPX) protocol, Lotus Notes, simple network management protocol (SNMP), Multiple Internet Mail Exchange (MIME) protocol, Web Network File System (WFNS) protocol, File Transfer Protocol (FTP), Fiber Distributed Data Interface (FDDI) and Reliable, Multi-cast Transfer Protocol (RMTP).

52. The system of claim 10, wherein the mobile unit is configured to transfer information as encrypted information.

53. The system of claim 10, wherein the wireless LAN operates as a secured private intranet and transfers encrypted information.

54. The system of claim 10, wherein the satellite communication system transfers encrypted information and comprises secure firewall software programs.

55. The system of claim 10, wherein the satellite communication system allows for user access to the World Wide Web through one or more web-based software applications.

56. The system of claim 10, wherein the individual computer at each of the plurality of nodes allows for the use of one or more web-based applications selected from the group consisting of a web browser application, an electronic mail application, an Internet Relay Chat (IRC) application, a voice communication application and a database management application.

57. The system of claim 10, wherein the satellite communication system allows for user operation through Common Gateway Interface (CGI).

58. The system of claim 10, wherein the satellite communication subsystem allows for user operation through Dynamic HyperText Markup Language (DHTML).

59. The system of claim 10, wherein the satellite communication system allows for user operation through extensible Markup Language (XML).

60. The system of claim 10, wherein the satellite communication system allows for user operation through extensible Standard Generalized Markup Language (SGML).

61. The system of claim 10, wherein the wireless LAN covers an on-site radius of up to 0.5 miles and operates at a range between 1 to 100 Mbps.

62. The system of claim 10, wherein the mobile unit is housed in a custom fitted motor home.

63. The system of claim 10, wherein the wireless LAN has video conferencing capabilities.

64. The system of claim 10, wherein the mobile unit comprises a portable field unit.

65. The system of claim 10, wherein the mobile unit comprises a portable field unit, the portable field unit comprising a computer with RAID arrays and one or more antenna systems, wherein one or more antenna systems are for Intranet services and one or more antenna systems for image delivery.

66. The system of claim 10, further comprising one or more network operations centers, the one or more network operations centers operative to control the relay of information.

67. The system of claim 13, wherein the mobile hub station is configured to transfer information using multiple protocols selected from the group consisting of IEEE 802.10 protocol, Internet Packet Exchange (IPX) protocol, Lotus Notes, simple network management protocol (SNMP), Multiple Internet Mail Exchange (MIME) protocol, Web Network File System (WFNS) protocol, File Transfer Protocol (FTP), Fiber Distributed Data Interface (FDDI) and Reliable, Mutli-cast Transfer Protocol (RMTP).

68. The system of claim 13, wherein the mobile hub station is configured to transfer information as encrypted information.

69. The system of claim 13, wherein the wireless LAN operates as a secured private intranet and transfers encrypted information.

70. The system of claim 13, wherein the satellite communication system transfers encrypted information and comprises secure firewall software programs.

71. The system of claim 13, wherein the satellite communication system allows for user access to the World Wide Web through one or more web-based applications.

72. The system of claim 13, wherein the or more web-based applications comprises one or more applications selected from the group consisting of a web browser application, an electronic mail application, an Internet Relay Chat (IRC) application, a voice communication application and a database management application.

73. The system of claim 13, wherein the satellite communication system allows for user operation through Common Gateway Interface (CGI).

74. The system of claim 13, wherein the satellite communication system allows for user operation through Dynamic HyperText Markup Language (DHTML).

75. The system of claim 13, wherein the satellite communication system allows for user operation through extensible Markup Language (XML).

76. The system of claim 13, wherein the satellite communication system allows for user operation through extensible Standard Generalized Markup Language (SGML).

77. The system of claim 16, wherein the at least one personal computer at each of the plurality of nodes allows for the display of web browser software.

78. The system of claim 13, wherein the wireless LAN covers an on-site radius of up to 0.5 miles and operates at a range between 1 to 100 Mbps.

79. The system of claim 13, wherein the mobile hub station is housed in a custom fitted motor home.

80. The system of claim 13, wherein the wireless LAN has video conferencing capabilities.

81. The system of claim 13, wherein the mobile hub station is housed in a vehicle and links the wireless LAN to the Internet through the satellite communication system.

82. The system of claim 13, wherein the mobile hub station comprises a portable field unit, the portable field unit comprising a computer with RAID arrays and one or more antenna systems, wherein one or more antenna systems are for Intranet services and one or more antenna systems for image delivery.

83. The system of claim 22 wherein the mobile vehicle or portable field unit is configured to transfer information using protocols selected from the group consisting of IEEE 802.10 protocol, Internet Packet Exchange (IPX) protocol, Lotus Notes, simple network management protocol (SNMP), Multiple Internet Mail Exchange (MIME) protocol, Web Network File System (WFNS) protocol, File Transfer Protocol (FTP), Fiber Distributed Data Interface (FDDI) and Reliable, Multi-cast Transfer Protocol (RMTP).

84. The system of claim 22, wherein the mobile vehicle or portable field unit is configured to transfer information as encrypted information.

85. The system of claim 22, wherein the wireless LAN operates as a secured private intranet and transfers encrypted information.

86. The system of claim 22, wherein the wireless WAN transfers encrypted information and comprises secure firewall software programs.

87. The system of claim 22, wherein the individual personal computer at each of the plurality of nodes allows for the display of web browser software.

88. The system of claim 22, wherein the wireless LAN covers an on-site radius of up to 0.5 miles and operates at a range between 1 to 100 Mbps.

89. The system of claim 22, wherein the wireless LAN has video conferencing capabilities.

90. The system of claim 22, wherein the mobile vehicle or portable field unit links the wireless LAN to the Internet through wireless WAN.

91. The system of claim 22, wherein the portable field unit comprises a computer with RAID arrays and one or more antenna systems, wherein one or more antenna systems are for Intranet services and one or more antenna systems for image delivery.

92. The system of claim 22, further comprising one or more network operations centers, the one or more network operations centers operative to control the relay of information.

93. The system of claim 28, wherein each mobile vehicle or portable field unit is configured to transfer information using protocols selected from the group consisting of TCP/IP protocol, IEEE 802.10 protocol, Internet Packet Exchange (IPX) protocol and File Transfer Protocol (FTP).

94. The system of claim 28, wherein each mobile vehicle or portable field unit is configured to transfer information as encrypted information.

95. The system of claim 28, wherein the wireless LAN operates as a secured private intranet and transfers encrypted information.

96. The system of claim 28, wherein the satellite communication system transfers encrypted information and comprises secured firewall software programs.

97. The system of claim 28, wherein the satellite communication system allows for user operation through a graphical user interface (GUI) of the World Wide Web.

98. The system of claim 28, wherein the satellite communication system allows for user operation through Common Gateway Interface (CGI).

99. The system of claim 28, wherein the satellite communication system allows for user operation through Dynamic HyperText Markup Language (DHTML).

100. The system of claim 28, wherein the satellite communication system allows for user operation through extensible Markup Language (XML).

101. The system of claim 28, wherein the satellite communication system allows for user operation through extensible Standard Generalized Markup Language (SGML).

102. The system of claim 28, wherein the individual computer at each of the plurality of nodes allows for the display of web browser software.

103. The system of claim 28, wherein the wireless LAN covers an on-site radius of up to 0.5 miles and operates at a range between 1 to 100 Mbps.

104. The system of claim 1, wherein each portable field unit comprises a computer with RAID arrays and one or more antenna systems, wherein one or more antenna systems are for Intranet services and one or more antenna systems for image delivery.

105. The system of claim 1, wherein the wireless LAN is within an on-site radius of the mobile unit.

106. The system of claim 10, wherein the wireless LAN is within an on-site radius of the mobile unit.

107. The telecomputer network system of claim 13, wherein the wireless LAN is within an on-site radius of the mobile hub station.

108. The telecomputer network system of claim 22, wherein the wireless LAN is within an on-site radius of the mobile vehicle or portable field unit.

109. The telecomputer network system of claim 28, wherein the wireless LAN is within an on-site radius of each mobile vehicle or portable field unit.

\* \* \* \* \*

(12) EX PARTE REEXAMINATION CERTIFICATE (10103rd)
United States Patent
Clark et al.

(10) Number: US 6,445,777 C2
(45) Certificate Issued: Apr. 8, 2014

(54) MOBILE TELE-COMPUTER NETWORK

(75) Inventors: Curtis Clark, Beverly Hills, CA (US); James Pat Block, Los Angeles, CA (US); Raman Nagarajan, Los Angeles, CA (US)

(73) Assignee: Palm Finance Corporation, Santa Monica, CA (US)

Reexamination Request:
No. 90/012,729, Nov. 29, 2012
No. 90/012,790, Feb. 6, 2013

Reexamination Certificate for:
Patent No.: 6,445,777
Issued: Sep. 3, 2002
Appl. No.: 09/217,682
Filed: Dec. 21, 1998

Reexamination Certificate C1 6,445,777 issued Nov. 15, 2011

Certificate of Correction issued Jan. 7, 2003

Related U.S. Application Data

(63) Continuation-in-part of application No. 08/718,748, filed on Sep. 23, 1996, now Pat. No. 5,960,074.

(51) Int. Cl.
*H04L 29/06* (2006.01)
*H04L 12/28* (2006.01)

(52) U.S. Cl.
USPC ............. 379/88.13; 379/101.01; 379/102.01; 379/142.15; 379/201.01; 379/201.05; 379/88.17

(58) Field of Classification Search
None
See application file for complete search history.

(56) References Cited

To view the complete listing of prior art documents cited during the proceedings for Reexamination Control Numbers 90/012,729 and 90/012,790, please refer to the USPTO's public Patent Application Information Retrieval (PAIR) system under the Display References tab.

*Primary Examiner* — Ovidio Escalante

(57) ABSTRACT

A telecomputer network is described. The network comprises a satellite communication system, at least one mobile vehicle, and a wireless local area network (LAN). In one embodiment, the satellite communication system transfers information using ethernet packet switching. In one embodiment, the wireless LAN transfers information using the TCP/IP protocol. The mobile vehicle or portable field unit is configured to transfer information as a single nomadic transmission/reception point between the satellite communication system and the wireless LAN.

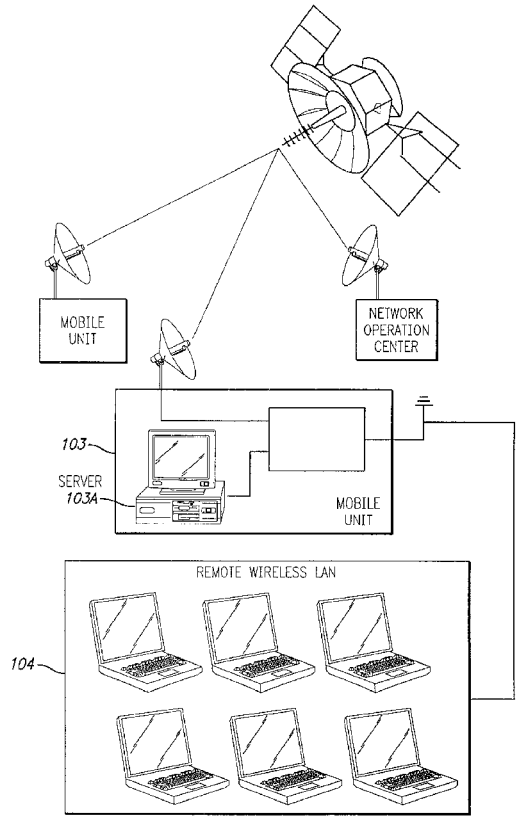

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-21, 29-36, 38-82 and 104-106 is confirmed.

Claims 22, 28, 37, 83-92 and 107-109 are determined to be patentable as amended.

Claims 23-27 and 93-103, dependent on an amended claim, are determined to be patentable.

New claim 110 is added and determined to be patentable.

22. A telecomputer network comprising:
a wireless wide area network (WAN) comprising a redundant satellite communication system configured to operate as a intranet;
a wireless local area network (LAN), wherein the wireless LAN comprises a plurality of nodes with an individual personal computer at each of the plurality of nodes; and
a mobile vehicle or portable field unit configured to transfer information as a single nomadic transmission/reception point between the satellite communication system and the wireless LAN, wherein transfers of information over the network [using] *use* the TCP/IP protocol.

28. A telecomputer network comprising:
a satellite communication system configured to operate as a secured private intranet to transfer information using [a] *an* ethernet packet switching protocol;
a wireless local area network (LAN) configured to transfer information using the ethernet packet protocol, wherein the wireless LAN comprises a plurality of nodes with an individual personal computer at each of the plurality of nodes; and
a plurality of mobile vehicles, or portable field units wherein each mobile vehicle or portable field unit is configured to transfer information as a single nomadic transmission/reception point between the satellite communication system and the wireless LAN.

37. The system of claim 33, wherein the one or more web-based software applications comprises *a* voice communication application.

83. The [system] *network* of claim 22 wherein the mobile vehicle or portable field unit is configured to transfer information using protocols selected from the group consisting of IEEE 802.10 protocol, Internet Packet Exchange (IPX) protocol, Lotus Notes, simple network management protocol (SNMP), Multiple Internet Mail Exchange (MIME) protocol, Web Network File System (WFNS) protocol, File Transfer Protocol (FTP), Fiber Distributed Data Interface (FDDI) and Reliable, Multi-cast Transfer Protocol (RMTP).

84. The [system] *network* of claim 22, wherein the mobile vehicle or portable field unit is configured to transfer information as encrypted information.

85. The [system] *network* of claim 22, wherein the wireless LAN operates as a secured private intranet and transfers encrypted information.

86. The [system] *network* of claim 22, wherein the wireless WAN transfers encrypted information and comprises secure firewall software programs.

87. The [system] *network* of claim 22, wherein the individual personal computer at each of the plurality of nodes allows for the display of web browser software.

88. The [system] *network* of claim 22, wherein the wireless LAN covers an on-site radius of up to 0.5 miles and operates at a range between 1 to 100 Mbps.

89. The [system] *network* of claim 22, wherein the wireless LAN has video conferencing capabilities.

90. The [system] *network* of claim 22, wherein the mobile vehicle or portable field unit links the wireless LAN to the Internet through *a* wireless WAN.

91. The [system] *network* of claim 22, wherein the portable field unit comprises a computer with RAID arrays and one or more antenna systems, wherein one or more antenna systems are for Intranet services and one or more antenna systems for image delivery.

92. The [system] *network* of claim 22, further comprising one or more network operations centers, the one or more network operations centers operative to control the relay of information.

107. The [telecomputer network] *system* of claim 13, wherein the wireless LAN is within an on-site radius of the mobile hub station.

108. The [telecomputer] network [system] of claim 22, wherein the wireless LAN is within an on-site radius of the mobile vehicle or portable field unit.

109. The [telecomputer] network [system] of claim 28, wherein the wireless LAN is within an on-site radius of the mobile vehicle or portable field unit.

*110. A system comprising:*
*a satellite communication subsystem;*
*a wireless local area network (LAN) that includes at least one computer; and*
*a mobile unit configured to transfer broadband information as a single nomadic transmission/reception point between the satellite communication subsystem and the wireless LAN using an Internet protocol.*

* * * * *